United States Patent

[11] 3,603,581

[72] Inventor Philip Richard Christal
Deptford, England
[21] Appl. No. 753,204
[22] Filed Aug. 16, 1968
[45] Patented Sept. 7, 1971
[73] Assignee The Molins Machine Company Limited
London, England
[32] Priority Aug. 23, 1967
[33] Great Britain
[31] 38864/67

[54] POSITIONING AND SECURING OF WORKPIECES FOR MACHINING OPERATIONS
2 Claims, 5 Drawing Figs.

[52] U.S. Cl. ..................... 269/307, 353/121
[51] Int. Cl. ..................... B23q 19/00
[50] Field of Search ..................... 29/464, 559; 269/307; 353/120, 122, 28, 121

[56] References Cited
UNITED STATES PATENTS
2,805,471 9/1957 Lowden ..................... 353/121 X
2,906,016 9/1957 Cannon ..................... 353/121 X
2,917,834 12/1959 Butler ..................... 353/121 X Primary Examiner—Andrew R. Juhasz
Assistant Examiner—Donald D. Evenson
Attorneys—Emory L. Groff and Emory L. Groff, Jr.

ABSTRACT: A method and apparatus for accurately locating a workpiece in positional relationship to a baseplate by projecting a light image having contrasting areas representing areas or features of the workpiece, or supports or clamps, etc., for securing the workpiece to the baseplate. The light image may be that of a template having representational markings or may be of the workpiece of supports, clamps, etc., to be secured to the baseplate. Instructions may be displayed simultaneously with the image and may appear on a separate screen. The template may be a photograph, i.e., print or transparency.

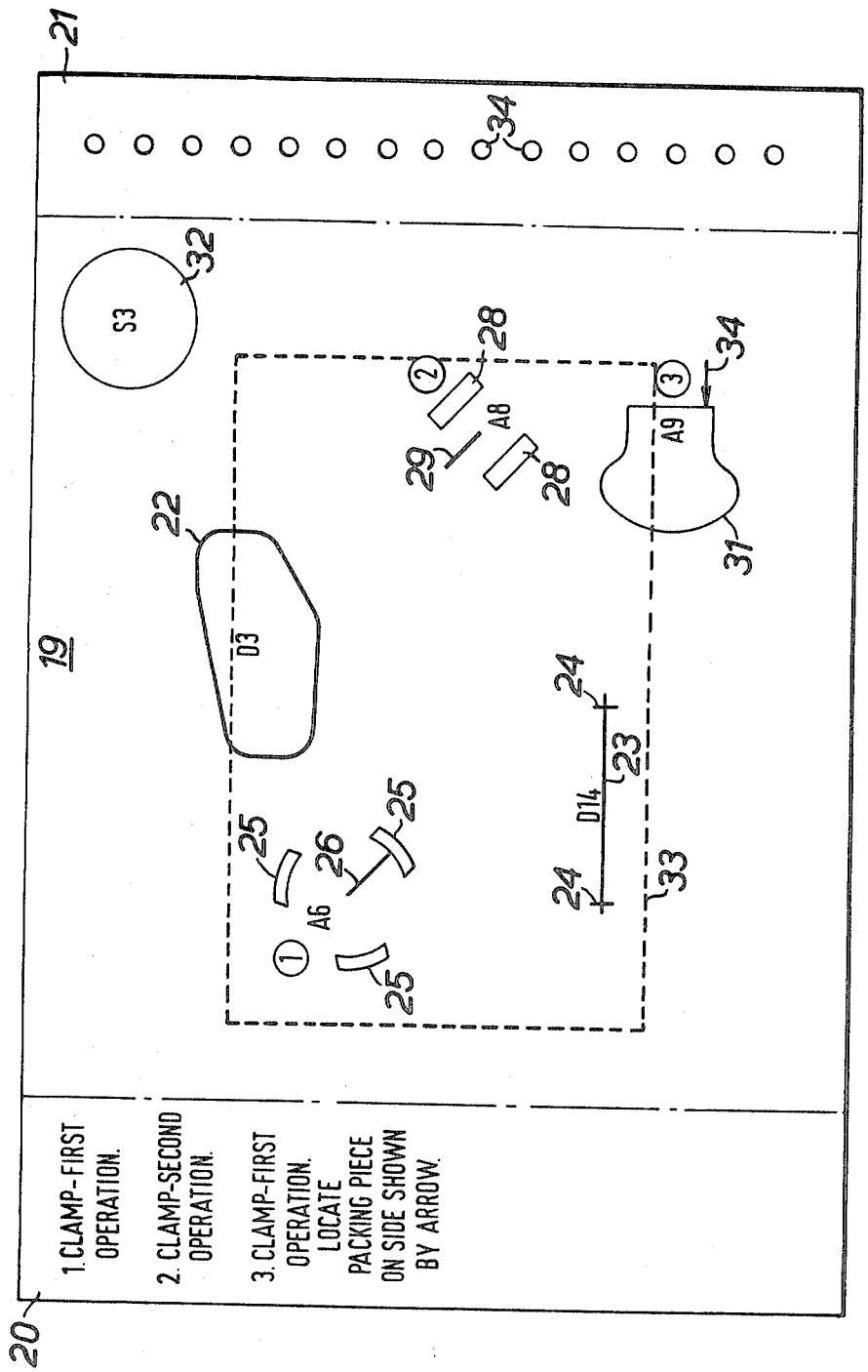

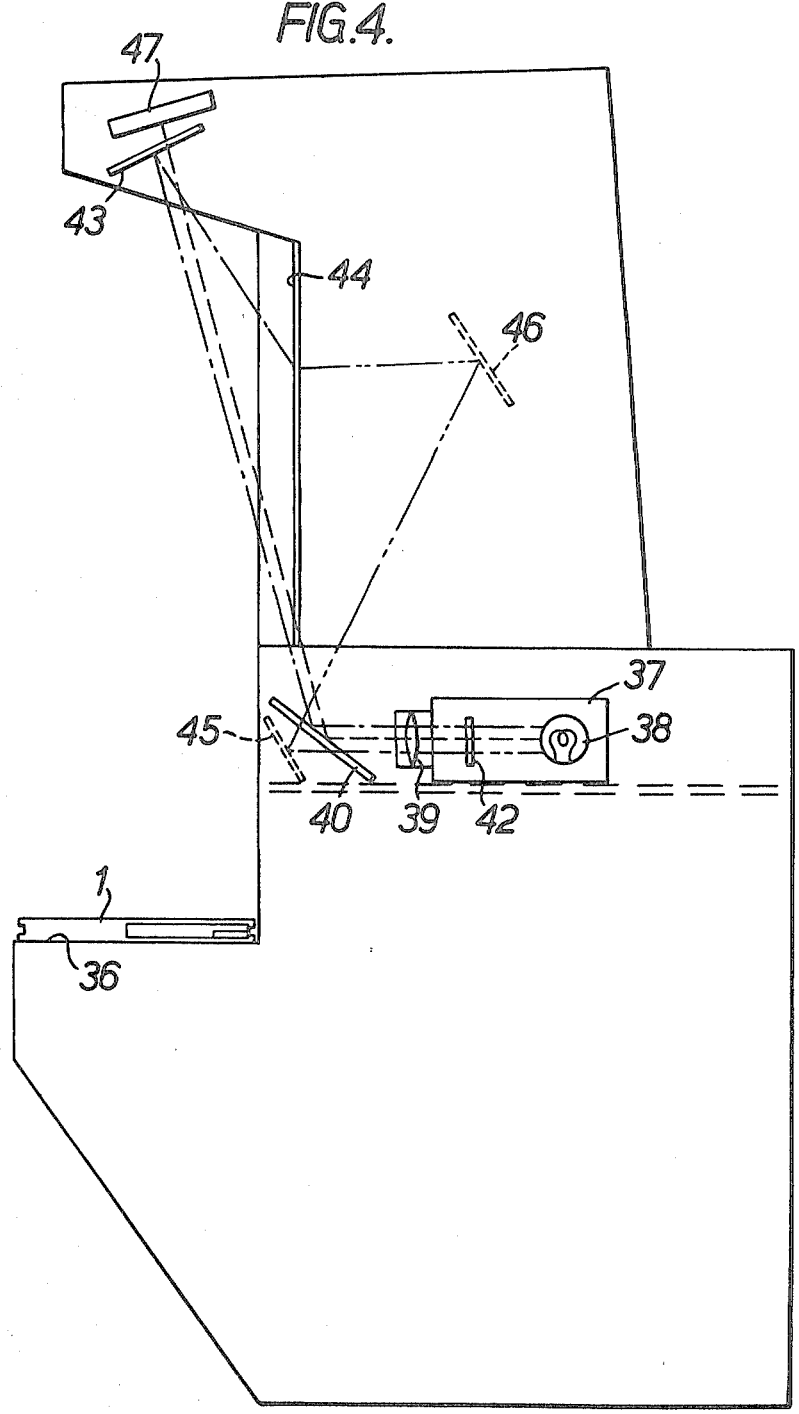

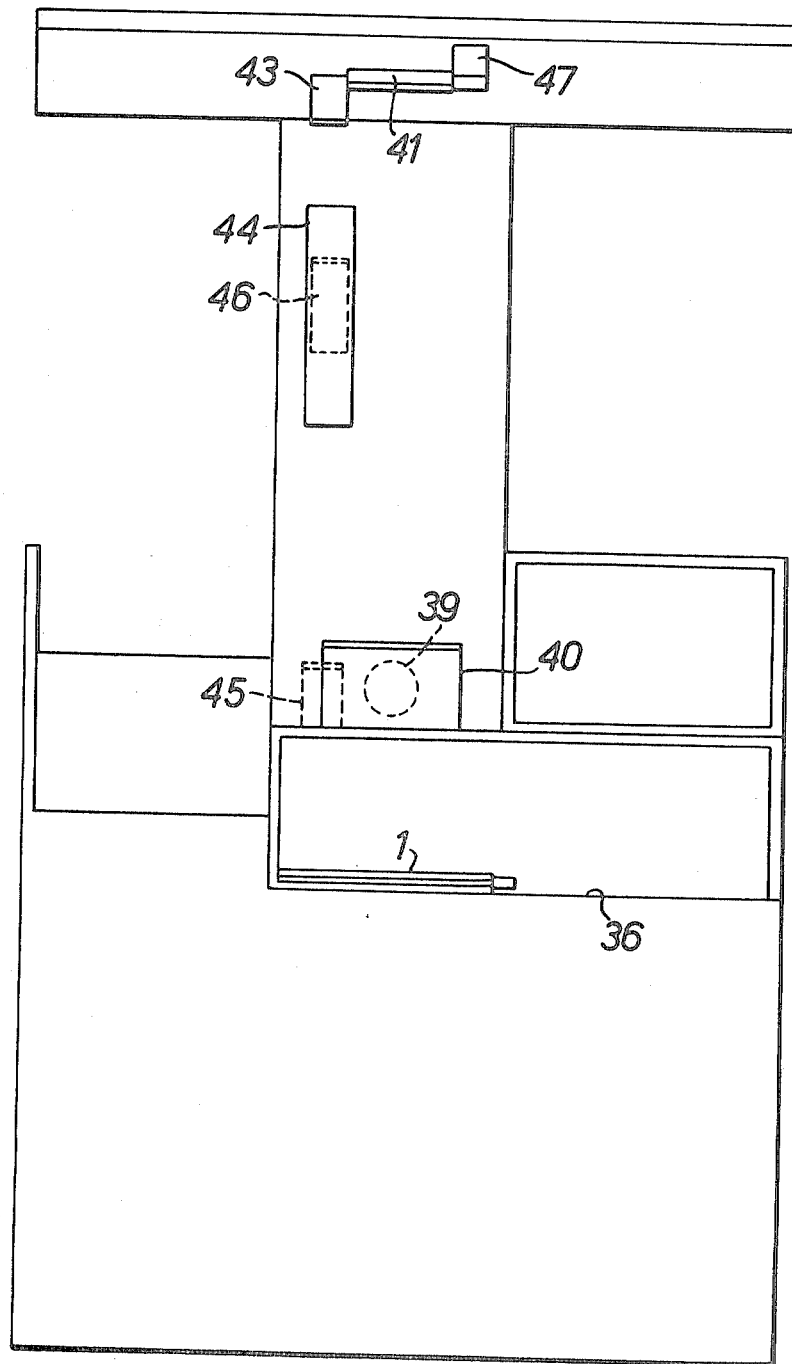

POSITIONING AND SECURING OF WORKPIECES FOR MACHINING OPERATIONS

This invention relates to improvements in the positioning and securing of workpieces to a baseplate or pallet for machining operations. In this specification, for convenience, the term baseplate will be used to include the term "pallet."

In U.S. application Ser. No. 718,887 now U.S. Pat. No. 3,537,697 and Ser. No. 752,391 there are disclosed methods of securing a workpiece to a baseplate which include application of a template to the baseplate, securing of supports to the baseplate in positional relationships defined by the template, and securing the workpiece to the supports. The workpiece may be secured to the supports, and thus to the baseplate, in a positional relationship defined by the template, which latter may also define a desired positional relationship of clamps by means of which the workpiece is secured to supports. The form of template described in the above-mentioned applications consists of a thin flat sheet of stiff material which is physically placed on the base plate in predetermined relationship thereto, ans has shaped cutouts defining the desired positions of the supports and in which the supports are located for securing to the baseplate. The template may also be physically placed on the workpiece so that clamps can be applied in positions defined by cutouts in the template, and the template may have holes at the desired positions of edges or corners of the workpiece, so that the workpiece can be positioned by locating its edges or corners under, so as to be visible through, these holes in the template.

According to the present invention, there is provided a method of securing a workpiece to a baseplate, comprising the steps of projecting the image of a template adapted to define a desired positional relationship to the baseplate of a part or parts, such as supports for the workpiece, or the workpiece itself, or clamps for the workpiece, to be secured to the baseplate, on the baseplate or on to said part or parts on the baseplate, and securing said part or parts to the baseplate in the positional relationship defined by the image of the template.

The present invention further provides apparatus for use in securing a workpiece to a baseplate comprising means to support the baseplate at a desired location, template-holding means to hold a template adapted to define a desired positional relationship to the baseplate of a part or parts, such as supports for the workpiece or the workpiece itself or clamps for the workpiece, to be secured to the baseplate and light projecting and directing means to project an image of the template onto the baseplate at the location, or onto the part or parts on the baseplate at the location, the template-holding means and light projection means being arranged so that the image is in a predetermined positional relationship to the baseplate such that the part or parts can be secured at positions defined by the image in the desired positional relationship to the baseplate.

The apparatus may include a screen onto which the image of instructions, for example written instructions, on the template is projected by said light projecting and directing mean. The apparatus may include a light-sensitive read head adapted to read and emit a signal indicative of an identification on the template, the light projecting and directing means being arranged to direct light passed through the identification on the template to the read head.

Further, according to the invention, there is provided for use in securing a workpiece to a baseplate a template having portions which contrast with, by having different light-absorption properties, e.g., are more translucent than other portions of the template, these portions and other portions defining a desired positional relationship to the baseplate of a part or parts, such as supports for the workpiece or the workpiece itself or clamps for the workpiece, to be secured to the baseplate, so that an image of the template can be projected on to the baseplate, or on to the part or parts on the baseplate, to show thereon the desired positional relationship.

The invention further provides a method of producing such a template comprising the step of photographing an arrangement of contrasting portions defining the desired positional relationship to produce a photograph having corresponding contrasting portions, e.g., photographing lighter and darker portions to produce, on the photograph, corresponding portions of greater and less translucency. For example, an object part or object parts, corresponding in shape and size to the part or parts to be secured to the baseplate, and arranged in the desired positional relationship, may be photographed, the object part or parts being suitably contrasted, or having portions which are suitably contrasted, to the background to provide the contrasting portions, e.g., of greater or less translucency, in the photograph. The photograph may be taken through a light path which is a reversal of the light path to be used in projecting the image of the template.

The template may have instructions, such as written instructions, thereon in a form such that an image of the instructions can be projected onto a screen, and may have an identification, such as a number based on a binary system, in a form such that the identification can be communicated to a light-sensitive read head by light projected through the identification and onto the read head.

Devices in accordance with the present invention will not be described, by way of example, with reference to the accompanying drawings, in which:

FIG. 3 is a plan view of a template,

FIG. 4 is a view similar to FIG. 2 showing further features of the work-setting station, and FIG. 5 is a front view of the work-setting station shown in FIG. 4.

Figure 1:
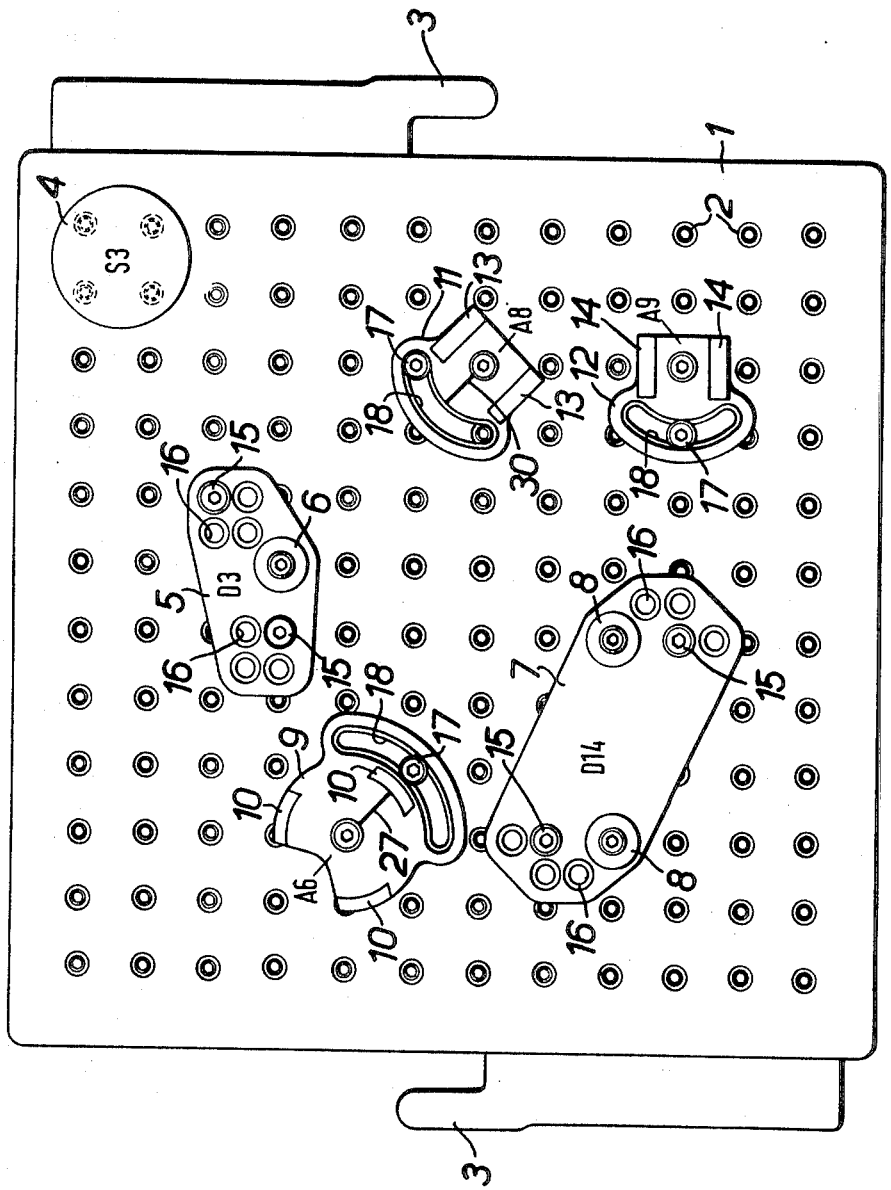
FIG. 1 is a plan view of a pallet having supports fixed thereto.

FIG. 1 shows a pallet 1 having tapped fixing holes 2 arranged at the junctions of a square grid as described in U.S. application, Ser. No. 718,887 now U.S. Pat. No. 3,537,997. The pallet has projecting side lugs 3, by means of which pallets can be linked in pairs as described in U.S. application, Ser. No. 636,993 now abandoned and a circular datum pad 4 screwed into tapped holes 2 adjacent one corner of the pallet, for location of a cutting tool in the spindle of a numerically controlled machine tool in a manner as described in U.S. Pat. No. Re. 25,956 and No. 3,241,451.

FIG. 1 shows fixed to the pallet 1 a number of supports of the same form and in the same arrangement as described in the specification of U.S. application, Ser. No. 752,391 and shown in the drawings accompanying that specification. Thus there is one support 5 with a single raised circular support surface 6, and a further support 7 with two raised circular supports surfaces 8. Another support 9 has three raised arcuate support surfaces 10, and further supports 11 and 12 each have two raised rectangular support surfaces 13 and 14, respectively. The supports 5 and 7 are secured to the pallet 1 by means of screws 15 passing through fixing holes 16 in the supports and threaded into tapped holes 2 in the pallet, and the supports 9, 11 and 12 are similarly secured by means of screws 17 passing through arcuate slots 18 in the supports and threaded into tapped holes 2 in the pallet. The form of the supports and their manner of fixing are more fully described in U.S. application, Ser. No. 718,887 now U.S. Pat. No. 3,537,697.

The supports are positioned on the pallet for securing thereto by use of a template whose image is projected onto the pallet. The template is shown in FIG. 3 and has a central portion 19, which defines the desired positional relationship of the supports to the pallet, and end portions 20 and 21 whose purpose will be described later.

The template is basically opaque and has portions or markings which are translucent and preferably transparent. These markings thus contrast with the opaque portions of the template and are of form to define the desired positional relationship of the supports to the pallet. Thus, there is a translucent outline 22 whose shape corresponds to that of the support 5. For the support 7 there is a translucent line 23 with crosslines 24 which intersect the line 23 at positions corresponding to the desired positions of the centers of the two circular support surfaces 8. For the support 9 there are three translucent outlines 25 defining the positions of the support surfaces 10, and a translucent radial line 26, corresponding to a line 27 marked on the support, to define the desired orientation of the support. For the support 11 there are two translucent rectangular outlines 28, corresponding to the support surfaces 13, and a line 29 which corresponds to a line 30 marked on the support and defines the orientation. For the support 12 there is a translucent outline 31 corresponding in shape to the support.

In addition to the markings defining the support positions the template has a translucent circular outline 32 corresponding to the datum pad 4 on the pallet 1. Marked on the template adjacent the appropriate markings are translucent letter and numeral identifications "D3," "D14," "A6," "A8," "A9" and "S3" which match corresponding markings on the supports and datum pad. These identifications are provided to ensure that the correct support is placed in the desired positions. Also marked on the template is an outline 33 defining the position of the workpiece which is to be secured to the supports.

The end portion 20 of the template carries written instructions, which are, like the other markings, translucent against an opaque background, and are adapted to have their image projected onto a screen. The instructions are numbered "1," "2" and "3," there being corresponding encircled numbers marked on the central portion 19 of the template indicating the positions to which the instructions apply, as well as an arrow 34 referred to in the instructions.

The end portion 21 of the template has a line of circles 35, some of which can be translucent while the others are opaque to provide an identifying number, based on a binary system, for the template. This identifying number is to be read by a light-sensitive read head to which light passed through the translucent circles is transmitted.

Figure 2:
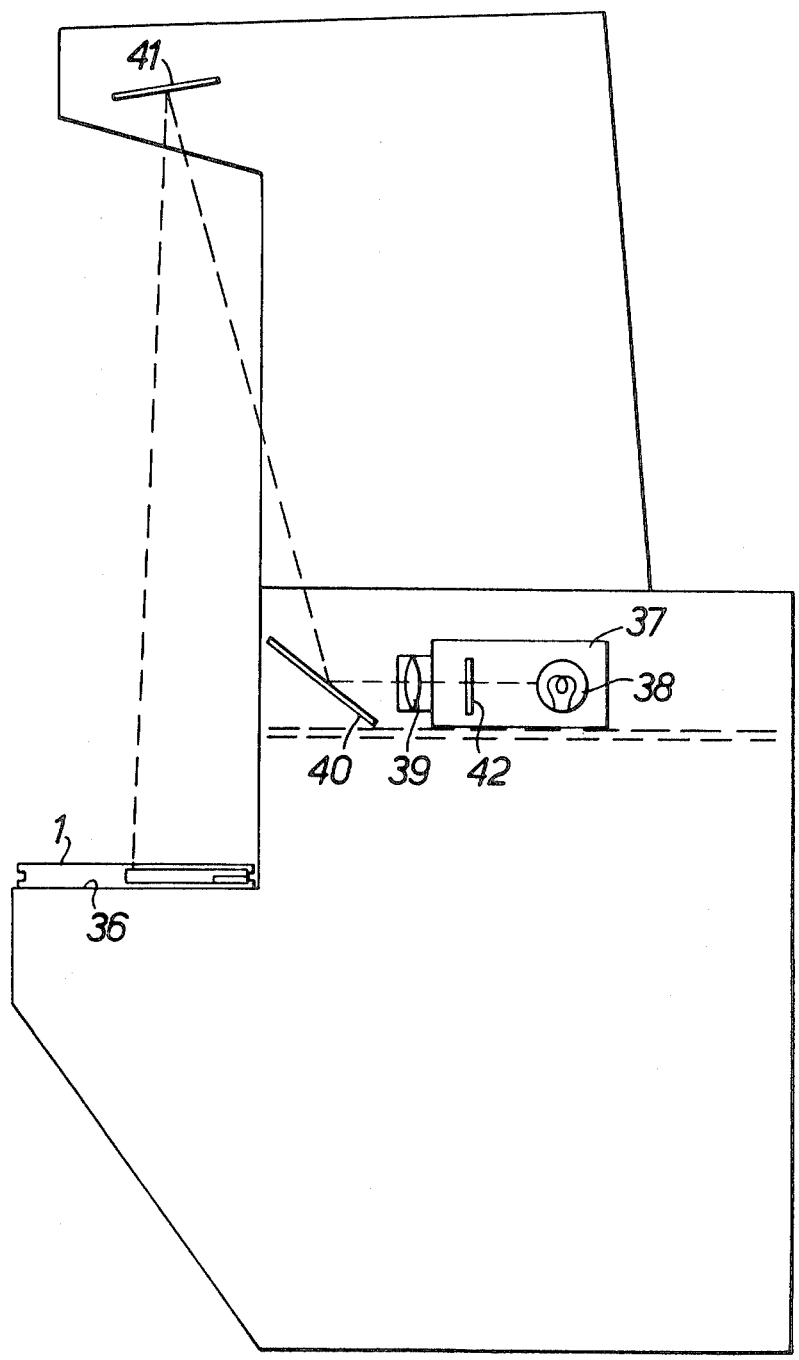
FIG. 2 is a side view of a work-setting station.

The template is used in apparatus shown in FIG. 2 which illustrates a work-setting station, i.e., a station at which workpieces are secured to pallets for machining. The apparatus comprises a horizontal platform or table 36 on which the pallet 1 is supported, the table having associated stops, or similar locating means, to locate the pallet in a predetermined position. In the station there is a projector 37 of diascope type, having a (diagrammatically illustrated) light source 38 and optical lens arrangement 39, arranged to project light via reflecting mirrors 40 and 41 towards the pallet on the table 36.

The projector 37 has a template holder 42 adapted to receive the template whose size is greatly exaggerated in FIG. 3. The holder 42 is arranged to hold the template in predetermined positional relationship to the pallet 1 on the table 36 and the optical arrangement is such that a magnified image of the template, with the various outlines and markings in the image of the same size as the corresponding parts whose positional relationship they define, is focused on the pallet 1 in predetermined positional relationship thereto. It will be noted that for the operator, who works from the left of the table 36 as viewed in FIG. 2, the face the pallet in the same direction as it is viewed in FIG. 1 the template must be inverted in the holder 42. Registration of the image of the outline 32 on the template with the outline of the datum pad 4 on the pallet provides a check that the template image is in the correct positional relationship to the pallet.

As can be seen from FIGS. 4 and 5, an image of the written instructions on the end portion 20 of the template is projected via the mirror 40 and a further mirror 43, beside and inclined relatively to the mirror 41 (which for clarity is not shown in FIG. 4), onto a vertical screen 44 facing the operator. If desired, this image could alternatively be projected via mirrors 45 and 46, shown in broken line in FIGS. 4 and 5, onto the back of the screen 44, which would be translucent, the written instructions in this case being inverted relative to the rest of the template.

The operator then proceeds to secure the supports and workpiece to the pallet 1 in the same manner as described in U.S. application, Ser. No. 752,391 except that, instead of using the flat metal template which is physically placed on the pallet as described in that application, the parts are secured to the pallet in the positions defined by the image of the template projected onto the pallet. It will be seen that when a support is placed on the pallet, part of the template image will appear on the support, and similarly when the workpiece is placed on the supports part of the image will be received on the workpiece. The optical arrangement of the projector 37 has a depth of focus such that a sufficiently clearly defined image is obtained, whether the image is on the pallet or on the supports or workpiece on the pallet.

The markings 25, 28 and 31, as well as defining positions for the supports 9, 11 and 12 also define positions for clamps, as described in U.S. application Ser. No. 752,391 and U.S. application Ser. No. 718,887 now Pat. No. 3,537,697, by which the workpiece is clamped to these supports. As indicated by the instructions on the end portion 20 of the template, whose image the operator can see on the screen 44, and as more fully explained in U.S. application Ser. No. 752,391, the clamps over the supports 9 and 12 are applied during a first work-setting operation, with a packing piece in the position indicated by the arrow 34, and the pallet, with the supports, workpiece and these clamps secured thereto, is transported to a numerically controlled machine tool where the workpiece undergoes an initial machining operation. The pallet loaded with the partly machined workpiece is then returned to the work-setting station at which a clamp is applied over the support 11 at a position defined by the image of the outlines 28 projected onto the workpiece, before the workpiece undergoes its final machining operation.

Light projected through the end portion 21 of the template is transmitted, via the mirror 40, to a light-sensitive read head 47, shown in FIGS. 4 and 5. This read head reads, and emits a signal indicative of the identifying number of the template provided, as explained above, by having one or more of the circles 34 translucent. The devices and apparatus described can be used to particular advantage in a machine tool system as described in U.S. application, Ser. No. 636,993, now abandoned and when so used the read head 47 feeds back the signal indicative of the identifying number of the template in use at the work-setting station to the computer controlling the operation of the system.

It will be appreciated that the template shown and described, and the supports, clamps and form of workpiece, are given only by way of illustration and example, and that different templates are provided to meet different requirements. Thus templates can be designed for use with any suitable forms of support, for example for any of the various supports and clamps described in U.S. application, Ser. No. 718,887, now U.S. Pat. No. 3,537,697, where it is explained how these supports and clamps are shaped and designed to ensure that the correct support or clamp is correctly placed in the desired position. As described above the supports and clamps can be provided with identifications, e.g., "A6," "A8," etc., which are repeated on the template. A different template can be provided for each different type of component to be made, and the identifying binary number provided in the end portion 21 can be used to identify each template, and hence the component for which it is to be used, different such numbers being provided by different combinations of translucent circles 34.

The template can conveniently be produced photographically by taking a photograph of a card having the desired markings on it, e.g., a black card with the markings in white, to produce a positive photograph in which the markings are translucent and the background opaque, or alternatively a white card wit the markings in black to produce a negative photograph with the same effect. As a further alternative, a photograph may be taken of actual supports or dummy supports of the same shape, which are arranged in the desired positional relationship and are painted, partly painted, e.g., white in outline, or otherwise made to contrast with their background, to provide the required markings on the template photograph.

The photograph can be taken through a light path which is a reversal of the light path to be used in projecting the image of the template. Thus, if a card with the necessary written instructions required on the end portion 20 of the template is placed on the screen 44, and a card with the required arrangement of contrasting circles to give the identifying number on the end portion 21 of the template is placed on the read head 47, and a card, or other arrangement such as suitably painted by dummy supports, giving contrasting markings corresponding to those required on the central portion 19 of the template is placed on or at the position of the pallet on the table 36, a photograph can be taken, with suitable lighting, by a camera in the place of the projector 37 to produce the required template. The template can thus be produced photographically on apparatus which is the same as, or essentially similar to that in which the template is to be used.

It will be appreciated that the markings on the template may take various forms and those shown and described are given only by way of example. As a further example, instead of an outline like the outline 22 for the support 5, the whole shape of the support may be made to contrast with the template background, for example may be transparent in an opaque template. Further, it will be seen that the opaque template with translucent markings may be replaced by a translucent template with opaque markings. Further, instead of a template having opaque and transparent portions, or portions which are more translucent than other portions, contrasting markings could be achieved by the use of different colors in the template.

It will be seen that by providing an optical arrangement giving the necessary depth of focus to obtain sufficiently clearly defined images at different levels from the pallet, the type of template described above can advantageously be used for securing a stepped workpiece, i.e., a workpiece having an upper surface of different levels, to the pallet, since the template image can be received on the workpiece surface at each level thereof and can thus define the position of a clamp on the surface to which it is to be applied.

What I claim is:

1. Apparatus for use in securing a workpiece to a baseplate, comprising means to support the baseplate at a desired location, template-holding means to hold a template for defining a desired positional relationship to the baseplate of parts to be secured to the baseplate, and a diascope projector to project an image of said template onto the baseplate at said location, said template-holding means and the projector being arranged so that said image is in a predetermined positional relationship to the baseplate such that said parts can be secured at positions defined by the image in said desired positional relationship to the baseplate, and a screen onto which the image of instructions is projected by the projector simultaneously with the projection of an image of the template.

2. Apparatus according to claim 1, further comprising a light-sensitive read head for reading and emitting a signal indicative of an identification on the template, said projector being arranged to direct light passed through the identification on the template to said read head.